Aug. 28, 1962 J. A. MAURER 3,051,042
METHOD OF RE-RECORDING A SOUND RECORD LINE AND APPARATUS FOR RE-RECORDING A SOUND RECORD LINE
Filed May 28, 1959 2 Sheets-Sheet 1
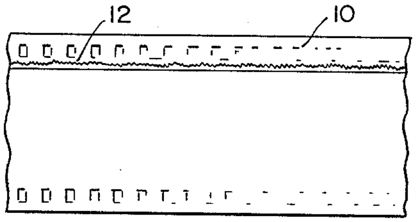
FIG. 1
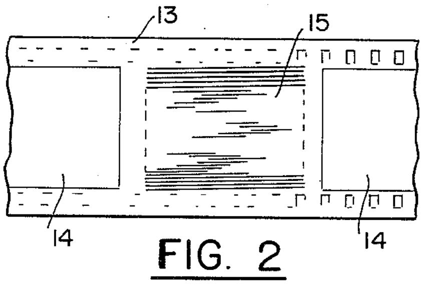
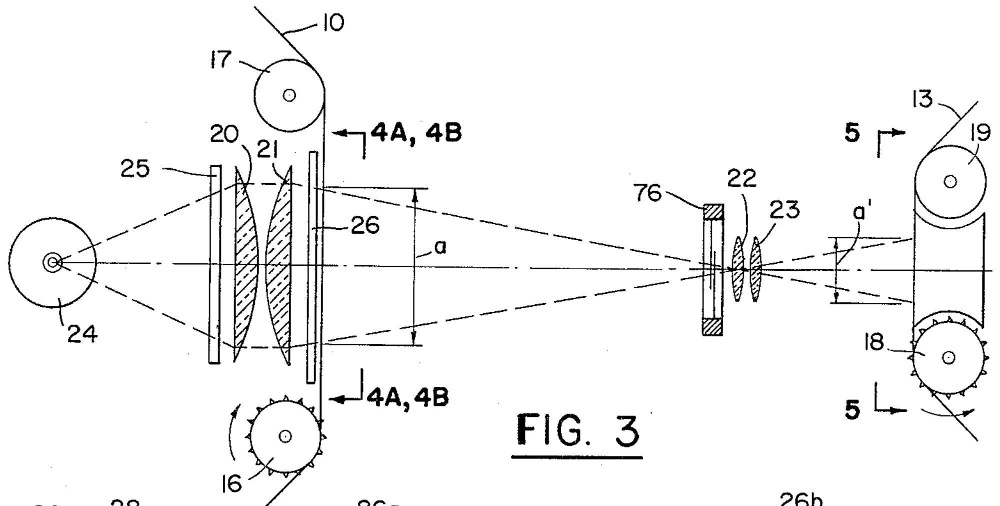
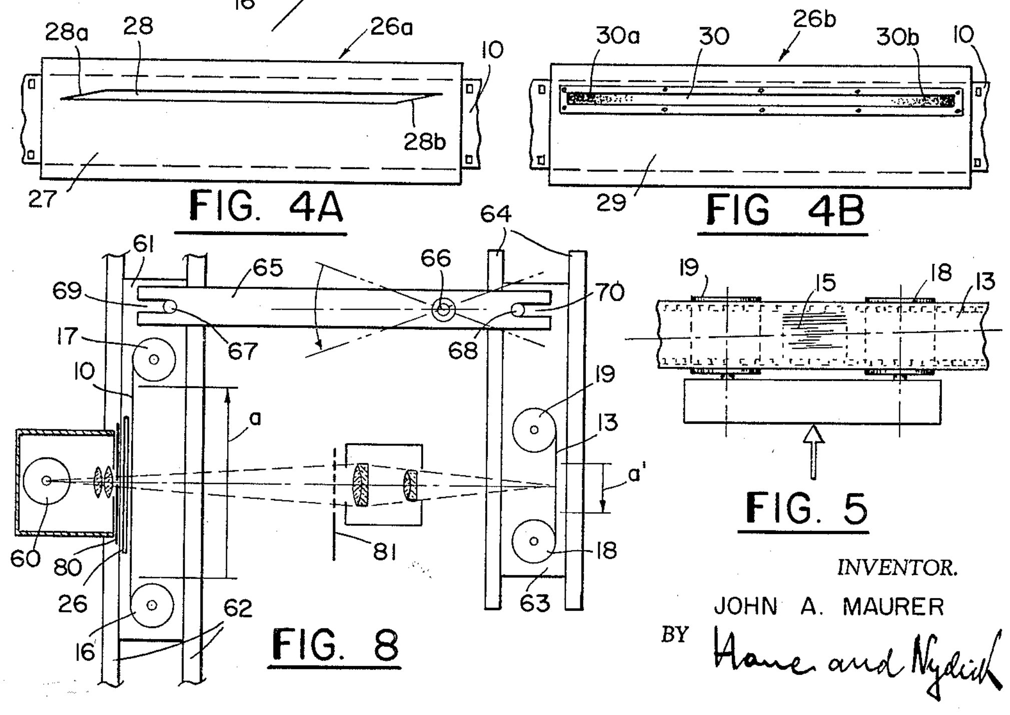
FIG. 4A, FIG. 4B, FIG. 5, FIG. 8
INVENTOR.
JOHN A. MAURER
BY Hane and Nydick
ATTORNEYS INVENTOR.
JOHN A. MAURER
BY Hane and Nydick
ATTORNEYS United States Patent Office 3,051,042

Patented Aug. 28, 1962

3,051,042

METHOD OF RE-RECORDING A SOUND RECORD LINE AND APPARATUS FOR RE-RECORDING A SOUND RECORD LINE

John A. Maurer, New York, N.Y., assignor to The Kalart Company Inc., Plainville, Conn.

Filed May 28, 1959, Ser. No. 816,608

16 Claims. (Cl. 88—24)

The present invention relates to a method of photographically recording sound record lines within a given sound record area, and more particularly to a method of photographically recording an array of adjacent, parallel sound record lines extending longitudinally on a strip of film, preferably of equal length and slightly inclined relative to each longitudinal edge of the film. The present invention is also related to an apparatus for recording the aforesaid array of sound record lines.

Sound record areas of the general kind above referred to and suitable sound equipment for reproducing sound therefrom are described in my co-pending application, Serial No. 779,676 filed December 11, 1958, now U.S. Patent No. 3,001,030 issued September 19, 1961.

Broadly, it is the object of the present invention to provide a novel and improved method of recording a sound record area in the form of an array of parallel, adjacent sound record lines and also to provide a novel and improved apparatus for carrying out the method of the invention.

A more specific object of the invention is to provide a method of and apparatus for recording from a continuous sound record line either of the variable density type or the variable area type a sound record area of the aforedescribed kind.

Another and more specific object of the invention is to provide an improved method of and apparatus for re-recording a continuous sound record line recorded on film in the form of an array of parallel, adjacent sound record lines by sectionalizing the continuous line and photographically recording the sections parallel and adjacent to each other.

Still another object of the invention is to provide a novel and improved method of and apparatus for photographically recording successive sections of a continuous sound record line in the form of an array of parallel, adjacent lines in which the end of one line section and the beginning of the next line section constitute continuations of the sound as recorded by the continuous line whereby the continuity of the sound record is preserved when the record lines in the array are reproduced in the order in which they are recorded.

A further object of the invention is to provide a novel and improved method of and apparatus for re-recording from a continuous sound record line an array in the form of parallel, adjacent sound record lines in which the recording at the end of each line in the array is faded-out and at the beginning of the next adjacent line is faded-in. This affords the advantage of eliminating any discontinuity in the reproduced sound which may occur when the reproducing equipment shifts from one line to the next adjacent one.

A still further object of the invention is to provide an apparatus for automatically moving relative to each other a master film bearing the continuous sound record line and a sensitized layer upon which the continuous record line is to be re-recorded in the form of an array of parallel, adjacent sections of the continuous line, so that successive sections of the continuous line are placed in position for recording therefrom and that the sensitized layer is advanced transversely of each line section recorded thereon through a predetermined distance.

Other and further objects, features and advantages of the invention will be pointed out hereinafter and set forth in the appended claims forming part of the application.

In the accompanying drawing, several preferred embodiments of the invention are shown by way of illustration and not by way of limitation.

In the darwing:

FIG. 1 is a portion of the master film bearing a continuous sound record line to be re-recorded.

FIG. 2 is a portion of a film bearing a sound record area recorded from the sound record line of FIG. 1.

FIG. 3 is a diagrammatic view of an apparatus for recording the sound record area of FIG. 2 from the sound record line of FIG. 1.

FIG. 4A is a section taken on line 4A—4A of FIG. 3 and showing a mask included in the optical system of FIG. 3.

FIG. 4B is a section taken on line 4B—4B of FIG. 3 and showing a modification of the mask.

FIG. 5 is a section taken on line 5—5 of FIG. 3 and showing an elevational view of the support means for the film upon which the sound record area is to be recorded.

FIG. 8 is a diagrammatic view of a modification of the apparatus for converting the sound record line of FIG. 1 into the sound record area of FIG. 2.

Figure 6:
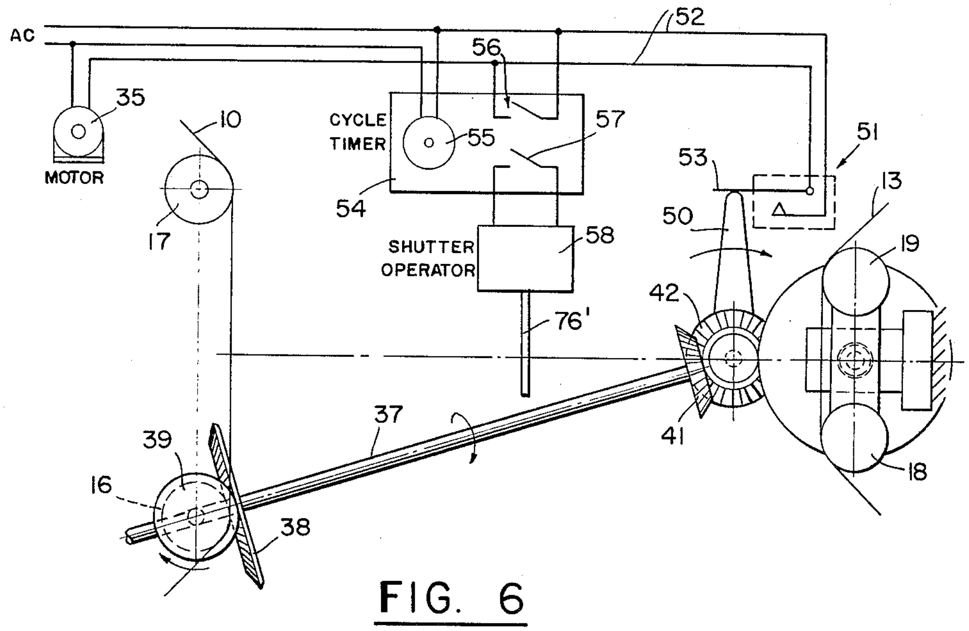
FIG. 6 is a diagrammatic elevational view of an automatic apparatus for converting the sound record line of FIG. 1 into the sound record area of FIG. 2.

Referring first to FIGS. 1 and 2 in detail, FIG. 1 should be visualized as showing a portion 10 of a conventional motion picture film and having recorded thereon a continuous sound record line 12, either of the variable density or the variable area type. FIG. 2 shows a strip of film 13 on which picture areas 14 and sound record areas 15 may alternate in longitudinal spacing. Each picture area and the associated sound record area, which is not necessarily adjacent to the respective picture area, may be visualized as constituting a program which is presented by projecting a picture area and reproducing the associated sound record area. A sound projector suitable for projecting and reproducing from the strip film of FIG. 2 is fully described in my aforesaid copending application, Serial No. 779,676.

The present invention is concerned with a method of and apparatus for converting the continuous sound record line 12 into the sound record area 15 of FIG. 2. The sound record area 15 is formed by an array of sound record lines parallel to each other and spaced by a suitable distance; about 80 lines per inch of height of the sound record area have been found to be satisfactory. As is shown in FIG. 2, the sound record lines are slightly inclined relative to either longitudinal edge of the film. Each of the lines in the sound record area 15 corresponds to a section of the continuous record line 12, but the length of the lines in area 15 need not correspond to the length of a section of equal length of line 12, and in fact, the record lines in the sound record area are generally reduced as to length in relation to the corresponding section of sound record line 12 as will appear from the subsequent description.

The record lines in area 15 are preferably of equal length and each line has advantageously at one end a fade-out portion and at the other end a fade-in portion. These fade-out and fade-in portions are so disposed that all the fade-out portions are at one end and all the fade-in portions are at the other end of adjacent lines. As is now apaprent, if the sound record area of FIG. 2 is scanned proceeding from the lowermost line towards the uppermost line and from left to right, the continuity of the sound recorded by the continuous line 12 is preserved and the discontinuity in the sound reproduction which may occur when the scanning beam moves from the right hand end of one line to the left hand end of the next upper line, is reduced to a minimum or practically eliminated by the cooperating fade-out and fade-in portions at the end of the lines.

Referring now to FIGS. 3 through 5, FIG. 3 shows diagrammatically an apparatus for re-recording the sound line or sound track 12 on film 10, which track may be referred to as the master or positive track, upon film 13. The latter should be visualized as having a sensitized layer thereon. The apparatus comprises a carriage for film 10 which is indicated by a sprocket 16 and a guide roll 17. The sprocket should be visualized as being rotatable in the direction indicated by the arrow. The sprocket and the roller support a portion of film 10 in a plane position which portion includes the section of the sound record line 12 to be re-recorded on film 13. This section is indicated as having a length *a*.

The carriage for film 13 is similar to the carriage for film 10 in that it comprises a sprocket 18 and a guide roller 19. The sprocket is rotatable in the direction indicated by the arrow. As is shown in FIG. 3, carriage 18, 19 supports the section of film 13 upon which the sound record area 15 is to be recorded or printed, in a plane parallel to the plane in which sprocket 16 and a roller 17 support the respective section of film 10. In addition, the carriage for film 13 may be displaced laterally or transversely of the plane of the paper in FIG. 3 as is indicated in FIG. 5 by an arrow.

The optical system of the apparatus is shown as comprising four lens components 20, 21, 22 and 23 and a source of light 24. The optical system focuses the sound record line section *a* upon film 13 to record or print thereon a corresponding sound record line section *a'*. The length of the line *a'* may be equal to the length of *a*, or it may be expanded relative to this line, or it may be reduced relative thereto. A reduction is often preferable and a reduced length of line section *a'* is shown.

Any suitable lens system may be used, but generally a highly corrected system should be provided since the sound record line section printed on film 13 should contain extremely fine details. It has been found advantageous to provide lenses corrected for ultra-violet and also to provide a monochromatic filter 25 to eliminate the effects of chromatic aberration. A shutter 76 is interposed between films 10 and 13. The shutter may be of conventional design, but it should be a shutter which repeats exposure very accurately. Shutters of this kind, operated for instance by means of a solenoid, are readily available in the market. The apparatus finally comprises a mask 26 to produce fade-in and fade-out effects respectively, at the ends of each sound record line *a'*.

FIG. 4A shows a suitable mask *26a* in the form of an opaque strip 27 formed with a slot 28 wedge-shaped at both ends. The wedge-shaped portions *28a* and *28b* are slanted in opposite direction. Assuming that a record line section *a'* is scanned from left to right, strip portion *30a* will produce a fade-in effect and strip portion *30b* a fade-out effect.

The operation of the apparatus as hereinbefore described is as follows:

Let it be assumed that a section *a* of the continuous sound record line 12 is placed in position for recording and that the portion of film 13 upon which a sound record area 15 is to be recorded or printed is also placed in position. Actuation of shutter 26 will then effect printing or recording of a corresponding line section *a'* on film 13. A new section *a* is then moved into position by turning sprocket 16 through an appropriate angle and the carriage for film 13 is transversely displaced through a distance corresponding to the selected transverse spacing of line sections *a'*. As is apparent, repetition of the aforedescribed sequence of steps will step by step sectionalize the continuous sound record line 12 and result in an array of parallel, adjacent lines on the sound record area 15. The recording or printing of line section *a'* on sound record area 15 may either progress upwardly or downwardly as seen in FIG. 2. In this connection, it may be mentioned that the sound reproducing equipment as disclosed in my co-pending application Serial No. 779,676 calls for an upwardly progressing recording.

Assuming that an upwardly progressing recording is effected, it is now apparent that a scanning of the parallel line sections recorded on sound record area 15, progressing from the lowermost line to the uppermost line, will duplicate a scanning of the continuous sound record line 12, any discontinuity that may occur in the reproduction during the shifting from one line section to the next upper one being eliminated or at least greatly mitigated by the effect of mask 26.

After the recording or printing of a sound record area 15 has been completed, that is, when the message intended for that sound record area has been recorded, another portion of the sensitized layer of film 13 is moved into position by appropriately rotating sprocket 18. The apparatus is now ready to start the recording or printing of another sound record area and so forth.

The rotation of sprockets 16 and 18 and the lateral displacement of the carriage for film 13 may be effected manually or automatically, as may also the actuation of shutter 26.

An automatic operation of the apparatus will now be described in connection with FIGS. 6 and 7.

Figure 7:
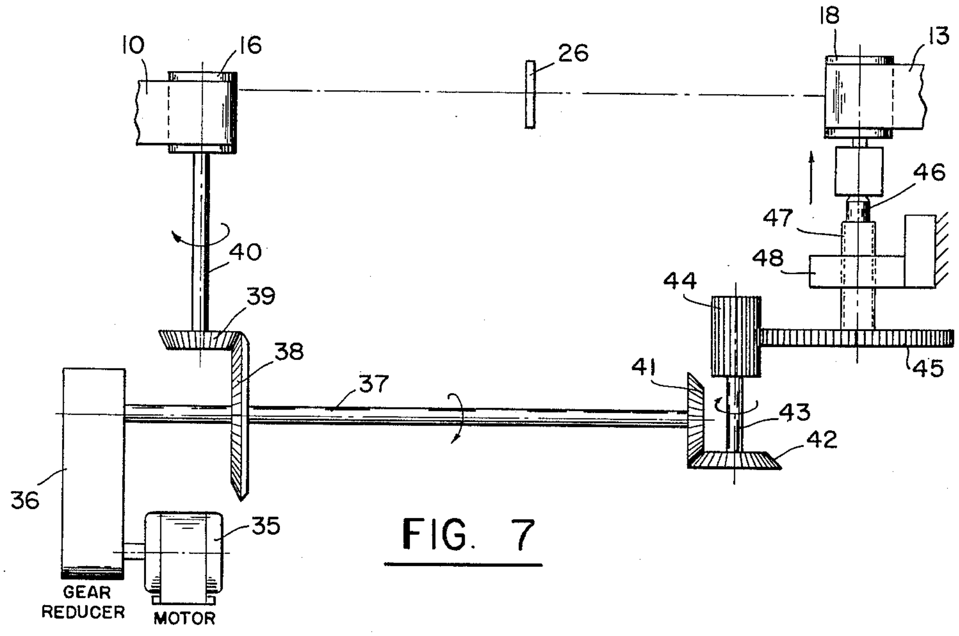
FIG. 7 is a plan view of FIG. 6.

To simplify the illustration, the optical system and the mask of the previously described apparatus are not shown in FIGS. 6 and 7, but it should be assumed that they are arranged in a manner similar to the one described. The corresponding components of the apparatus are designated in FIGS. 6 and 7 by the same reference numerals. It should be further noted that the drive and control means as shown in FIGS. 6 and 7 are diagrammatic, but believed fully adequate to exemplify automatic control of the apparatus.

The apparatus of FIGS. 6 and 7 comprises a motor 35 which through a gear reducer 36 drives a shaft 37. This shaft seats a bevel gear 38 which drives through a second bevel gear 39 a shaft 40 seating sprocket 16. As is apparent, by appropriate selection of the ratio of transmission any desired rate of transport of film 10 can be obtained. Shaft 37 seats a second bevel gear 41 which through a bevel gear 42 drives a shaft 43 seating an elongated pinion 44. Pinion 44 is in mesh with a gear 45 mounted on a drive shaft 46 supporting the carriage for film 13. Shaft 46 has a threaded portion 47 threaded through a fixed nut 48. As is apparent, rotation of shaft 37 will effect lateral displacement of the carriage for film 13, that is, upward as seen in FIG. 7. Again an appropriate selection of the ratio of transmission will permit any desired rate of lateral displacement of film 13, for instance one revolution of shaft 37 may result in a lateral displacement of twenty thousandths of an inch of film 13. The apparatus further comprises a cam arm 50 rotatable in unison with shaft 43. Cam arm 50 controls a switch 51 in the power line 52 for motor 35. Switch 51 is a normally closed switch such as a normally closed Micro-Switch. Arm 50 coacts with the movable contact arm 53 of the switch and when in engagement with the same opens the switch. The apparatus further comprises a cycle timer 54 of conventional design. This timer may be visualized as comprising a motor 55 and two normally open switches 56 and 57. Switch 56 controls the powerline 52 and switch 57 controls an operator 58 for shutter 26. Cycle timers of this kind are well-known and readily available in the market. The cycle timer, when started, will close and open its switches 56 and 57 in a predetermined sequence and at predetermined time intervals.

The operation of the apparatus according to FIGS. 6 and 7 is as follows:

Let it be assumed that appropriate portions of films 10 and 13 are in position for printing a sound record line section *a'* upon film 13 as previously explained. To start the cycle, the cycle timer 54 is operated. The cycle timer will first momentarily close its switch 57 thereby operating shutter 76' by activating operator 58. Then switch 56 is momentarily closed thereby shorting out switch 51 (shown as being open) and thus starting motor 35. The resulting rotation of shaft 37 moves cam arm 50 away from switch contact 53 so that switch 51 closes. As a result, the power circuit for motor 35 is maintained when switch 56 reopens.

When shaft 37 has rotated through an angle sufficient to bring arm 50 again into engagement with switch arm 53, switch 51 is opened and motor 35 is stopped. A new section of the continuous record line 12 on film 10 has now been brought into position for recording and film 13 has been laterally displaced through the selected distance.

The apparatus is now ready for the starting of a new cycle which again will be initiated by a temporary closing of switch 57.

In the previously described exemplifications of the invention, the continuous sound record line is converted into an array of adjacent, parallel sound record lines by printing or recording successive sections *a* of line 12, that is, each line section is printed in its entirety by one exposure of the respective linear area on film 13 while both films 10 and 13 are standing still. Instead of printing one complete line section at a time, each line section *a* on film 10 can also be printed on film 13 by focusing a very narrow portion of the line section *a* upon film 13 while moving the two films relative to each along a linear parallel path thereby gradually recording the entire record line section *a* on film 10 as record line *a'* on film 13.

The carriages for the two films 10 and 13 are shown in FIG. 8 in a simplified manner. The filter 25 is omitted to simplify the illustration, but should be visualized as being provided. It should be further visualized that the film carriage 18, 19 is mounted for displacement laterally or transversely of the plane of the drawing as has been explained in connection with the previously described figures.

The optical system is shown as comprising six lens components of suitable design and a source of light 60. The lens components should be so that very small areas of record line *a* are focused upon the area on film 13 selected for recording the sound record area 15. A stationary mask 80 confines the illumination of record line 10 to a small area in the form of a transversely extending slit. In other words, the area imaged upon film 13 by the lens system should be as closely to a narrow transverse line as practical. Suitable short focal length lenses with high definition are available for the purpose.

Film carriage 16, 17 is mounted on a plate 61 which is guided and slidable in guide tracks 62. Similarly, film carriage 18, 19 is mounted on a plate 63 which is slidable and guided in tracks 64 so that the two film carriages are displaceable relative to each other in parallel planes while the optical system remains stationary. To effect such displacement of the plates and carriages, a link 65 is provided, pivotal about a pivot 66. Each end of this link is pivoted to plates 61 and 63 by pins 67 and 68 respectively, extending from plates 61 and 63 and engaging elongated slots 69 and 70 respectively. As is apparent, pivoting of link 65 about its pivot 66, as indicated by the arrow, will cause displacement of both film carriages in opposite direction and through an angle determined by the angle of tilting of link 65. A mask 26 as described in connection with FIGS. 4A or 4B is mounted on plate 61 of carriage 16, 17 for movement in unison therewith. A shutter 81 of conventional design, operated for instance by means of a solenoid, serves to cut off the light when the carriages are being returned after the exposure of a section of the record line *a*. The length of record line *a'* in relation to record line *a* may be conveniently controlled by selecting the ratio of speed proportional to the optical reduction rate of the employed optical system. Record line *a'* may be of either equal length as record line *a*, or it may be expanded in relation to that line, or it may be reduced in length as shown.

Assuming that a narrow transverse line at one end of record line *a* is focused upon film 13, the two film carriages are then displaced relative to each other as described. Successive focus points will be focused upon film 13 until the entire line section A is recorded on the film. Then the two film carriages are returned into the initial position while shutter 81 is closed and film carriage 18, 19 is laterally displaced by a distance corresponding to the desired spacing of the lines. This cycle is repeated until the sound record line 12 or a selected length thereof is recorded on film 13 in the form of an array of parallel, adjacent sound record lines previously described.

The control of the relative movements involved in the operation of the apparatus according to FIG. 8 may be effected manually or automatically. Suitable arrangements for an automatic control are readily apparent, and in this connection attention is directed to the automatic arrangement described in connection with FIGS. 6 and 7.

While the invention has been described in detail with respect to certain now preferred examples and embodiments of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. A method of recording on a carrier a sound record area in the form of an array of parallel adjacent sound record lines, said method comprising the steps of providing a first carrier having recorded thereon a linear continuous sound record line and a second carrier sensitized to receive a recording for forming said array on the second carrier, re-recording a predetermined section of said continuous record line upon said second carrier, moving said first carrier through a predetermined distance in the direction of the continuous record line thereon and moving the second carrier transversely of the section recorded thereon through a predetermined distance to place both carriers in position for the recording of a second section on the second carrier to duplicate section by section the continuous recording on the first carrier in the form of parallel sections on the second carrier.

2. A method of photographically recording on a carrier a sound record area in the form of an array of parallel adjacent sound record lines, said method comprising the steps of providing a positive film having photographically recorded thereon a linear continuous sound record line and a light-sensitized negative film for forming thereon said array, imaging by optical means a predetermined section of said continuous sound record line on the negative film to re-record said section thereon, moving said positive film through a predetermined distance in the direction of the continuous record line thereon and moving the negative film transversely of the section recorded thereon through a predetermined distance to place both films in position for recording the thus located second section of the continuous sound record line on the negative film to duplicate section by section the continuous sound record line on the positive film in the form of parallel sections on the negative film.

3. The method according to claim 2 and further comprising the step of imaging each of said sections with a fade-in portion on one end and a fade-out portion on the other end in a disposition such that the fade-out and the fade-in portions respectively of adjacent lines are in juxtaposition.

4. The method of recording on a carrier a sound record area in the form of an array of parallel, adjacent sound record lines, said method comprising the steps of providing a first carrier having thereon continuous linear sound record line and a second carrier sensitized to receive a recording for recording said array thereon, recording a frequency duplicate of a predetermined section of said continuous record line on the second carrier, then advancing said first carrier through a predetermined distance in the direction of the record line thereon and advancing the second carrier transversely of the record line section recorded thereon through a predetermined distance, and recording the thus located second section of said continuous line on the second carrier thereby step by step recording said array of parallel, adjacent record lines on the second carrier.

5. The method of photographically recording on film a sound record area in the form of an array of parallel, adjacent sound record lines, said method comprising the steps of providing a positive film having photographically recorded thereon a continuous linear sound record line and a light-sensitized negative film for recording said array thereon, imaging by optical means a photographic copy of a predetermined length of said record line on the positive film upon the negative film while maintaining both films stationary, then advancing said positive film through a predetermined distance in the longitudinal direction of the record line thereon and advancing the negative film transversely of the line length recorded thereon through a predetermined distance, and imaging by said optical means the thus located second length of the record line on the positive film upon the negative film while again holding both films stationary thereby recording step by step said array of parallel, adjacent record lines on the negative film.

6. The method of recording on a carrier a sound record area in the form of an array of parallel, adjacent sound record lines, said method comprising the steps of providing a first carrier having recorded thereon a continuous linear sound record line and a second carrier sensitized to receive a recording for recording said array thereon, focusing by means of a mask a narrow area of the record line on the first carrier upon the second carrier by stationary optical means while displacing the two carriers in parallel planes and in opposite direction through a predetermined distance thereby progressively re-recording a corresponding section of this continuous record line on the second carrier, then advancing said first carrier in the direction of the record line thereon to move a second section into position for re-recording and advancing the second record carrier transversely of the record line section thereon, and then focusing by said mask a narrow area of the second section of the continuous record line now advanced into position for imaging upon the second carrier.

7. The method according to claim 6 and comprising the step of re-recording each of said sections with a fade-in portion on one end and a fade-out portion on the other end and in a disposition such that respectively all the fade-out and fade-in portions of adjacent line sections recorded on the second carrier are in juxtaposition at the ends.

8. An apparatus for recording on a carrier a sound record area in the form of an array of parallel, adjacent sound record lines, said apparatus comprising a first support means for supporting thereon a predetermined portion of a carrier having recorded thereon a master record in the form of a continuous linear sound record line, a second support means for supporting a second carrier sensitized for recording said array thereon, optical means for imaging a photographic copy of the supported master record section upon the second carrier thereby recording said section upon the second carrier, means for displacing the first carrier in the direction of the continuous record line thereon to move another portion of the master record into position for imaging, and means for displacing the second carrier transversely of the record line section recorded thereon.

9. An apparatus according to claim 8 and further comprising masking means included in said optical means, said masking means effecting a fade-in and a fade-out at the beginning and at the end respectively of each record line imaged upon the second carrier.

10. An apparatus according to claim 9 wherein said masking means comprises an opaque mask having a transparent slot wedge shaped at each end, the slants of the wedge shaped portions facing in opposite direction.

11. An apparatus according to claim 10 wherein said masking means comprise an elongated transparent member having at each end a portion gradually decreasing in transparency toward each end of the member.

12. An apparatus for photographically recording on film a sound record area in the form of an array of parallel, adjacent sound record lines, said apparatus comprising a first film guide for supporting and guiding a portion of a master film having recorded thereon a continuous linear master sound record line, a second guide for supporting and guiding a sensitized layer for recording thereon said array, optical means for imaging a photographic copy of the master record section recorded on the supported and guided film portion upon said layer, means for displacing said master film in the first guide through a predetermined distance in the direction of said continuous record line to place another portion of the master film and the respective record line section thereon in position for imaging, and second means for displacing said layer transversely of the record line section recorded thereon through a predetermined distance.

13. An apparatus according to claim 12 wherein said guided film portion and said layer are supported in parallel planes, said guided film portion being movable in its plane in the direction of the sound record line thereon and said layer being movable in its plane in the direction transversely of the record line section recorded thereon.

14. An apparatus for photographically recording on film a sound record area in the form of an array of parallel, adjacent sound record lines, said apparatus comprising a first film carriage for supporting in a plane a portion of a master film having recorded thereon a continuous linear sound record line, a second carrier for supporting in a spaced parallel plane a sensitized layer for recording thereon said array, optical means for focusing a predetermined linear length of the record line on the supported plane master film portion upon said layer thereby recording said length on the layer, means for displacing said master film portion in the first carrier in the direction of the sound record line thereon to place another portion of the master film in position for recording the respective record line length thereon on the layer, and second means for displacing said layer transversely of the record line length recorded thereon.

15. An apparatus for photographically recording on film a sound record area in the form of an array of parallel, adjacent sound record lines, said apparatus comprising a first film guide for supporting and guiding a portion of a master film having recorded thereon a continuous sound record line, a second guide for supporting and guiding a sensitized layer for recording thereon said array, optical means for focusing a predetermined linear length of the record line on the supported and guided master film portion upon said layer, said optical means including a shutter means interposed between said master film and said layer for exposing said layer for actuation of said shutter means, first drive means for moving said master film in the direction of the record line thereon through a predetermined distance within said first guide means to place another section of said continuous record line in said first guide, second drive means for displacing said layer transversely of the record line section recorded thereon through a predetermined distance, and automatic actuating means for operating said shutter means and said first and second drive means in a predetermined cyclic sequence.

16. An apparatus for photographically recording on film a sound record area in the form of an array of parallel, adjacent sound record lines, said apparatus comprising a first film guide for supporting and guiding a portion of a master film having recorded thereon a continuous sound record line, a second guide for supporting and guiding a sensitized layer for recording thereon said array, stationary optical means for focusing a point on the supported and guided section of the master record line upon said layer, drive means for oppositely displacing said master film and said layer in planes parallel to each other through a predetermined distance in the direction of the master record line thereby progressively imaging a corresponding length of the master record line upon said layer, and means for displacing said layer in its plane in the direction transversely of the record line section recorded thereon.

References Cited in the file of this patent

UNITED STATES PATENTS

| | | |
|---|---|---|
| 1,855,196 | Offenhauser | Apr. 26, 1932 |
| 1,884,167 | Owens | Oct. 25, 1932 |
| 2,193,465 | Newcomer | Mar. 12, 1940 |
| 2,710,661 | Webster | June 14, 1955 |
| 2,769,031 | Vilbig | Oct. 30, 1956 |
| 2,876,689 | Strange | Mar. 10, 1959 |
| 2,925,753 | Schwartz et al. | Feb. 23, 1960 |